United States Patent Office 3,329,480
Patented July 4, 1967

3,329,480
CRYSTALLINE ZIRCONO-SILICATE ZEOLITES
Dean Arthur Young, Yorba Linda, Calif., assignor to Union Oil Company of California, Los Angeles, Calif., a corporation of California
No Drawing. Filed Oct. 18, 1963, Ser. No. 318,801
8 Claims. (Cl. 23—111)

This invention relates to a new class of synthetic, Group IV–B metallo-silicate zeolites characterized by high ion exchange capacity, and conforming substantially to the following empirical formula:

$$(D_{2/n}O)_x:XO_2:(SiO_2)_y \qquad (1)$$

wherein D is a monovalent metal, a divalent metal, ammonium or hydrogen, $n$ is the valence of D, $x$ is a number from 0.5–4, X is one or more of the amphoteric metals of Group IV–B (i.e., titanium, zirconium and/or hafnium), and $y$ is a number from about 1 to 15, preferably 2–10.

The invention also includes novel methods for the manufacture of said zeolites. All of these methods include as their salient feature in common the reaction, in aqueous alkaline solution, of an alkali metal silicate with one or more alkali metal peroxo-Group IV–B metallates, to form a soluble alkali metal peroxo-Group IV–B metallo-silicate complex, which is then de-peroxidized to form a metastable alkali metal Group IV–B metallo-silicate complex, which in turn can be destabilized to precipitate an insoluble alkali metal Group IV–B metallo-silicate zeolite.

The new zeolites of this invention may be prepared in either crystalline or amorphous forms, depending upon the ratios of components and methods of preparation, as will be explained more fully hereinafter. The term "crystalline" is used herein to designate a solid state wherein crystallinity is detectable by conventional X-ray diffraction analysis. Conversely the term "amorphous" is used to designate a solid state wherein crystallinity is not detectable by such methods, notwithstanding the fact that microcrystalline aggregates may, and probably do, exist even in the so-called amorphous zeolites. All of the zeolites of this invention, whether crystalline or amorphous, are useful in conventional cation exchange applications, and are also useful as adsorbents for the separation of hydrocarbon mixtures, as well as other organic and inorganic fluid mixtures. The crystalline zeolites are particularly useful as selective adsorbents, in view of their more highly uniform crystal pore sizes, a characteristic which is common to other known zeolites commonly referred to in the art as "molecular sieves."

The metallo, e.g., sodium, forms of the zeolites, whether crystalline or amorphous, can be ion exchanged with ammonium salts to form the corresponding ammonium zeolites, which can then be heated to decompose the ammonium ion and convert the zeolite to a hydrogen form. These hydrogen forms possess active catalytic acidity, and can hence be employed as catalysts for the isomerization of paraffin hydrocarbons, olefins, and the like, and for hydrocarbon cracking. They can also be employed as bases for added hydrogenating components, and then become useful composite catalysts for hydrocatalytic processes such as hydroisomerization, hydroforming, hydrocracking and the like. Active hydrogenating metals which can be added to the zeolites include for example the Group VI–B and Group VIII metals, particularly nickel, iron, cobalt, platinum, palladium, rhodium, molybdenum and the like. Such metals may also form a part of the zeolitic cation structure of the zeolite by ion exchanging other metallo forms with aqueous solutions of a salt of the desired hydrogenating metal.

A novel class of crystalline titano-silicate zeolites of this invention corresponds to the empirical formula:

$$(D_{2/n}O)_x:TiO_2:(SiO_2)_y \qquad (2)$$

wherein D is a monovalent metal, a divalent metal, ammonium or hydrogen, $n$ is the valence of D, $x$ is a number from 0.5 to 3, and $y$ is a number from about 1.0 to 3.5. These titano-silicate zeolites appear to exhibit at least three different crystal forms, A, B and C, wherein the respective X-ray powder diffraction patterns include major $d$ spacings as follows:

| Crystal A: | Crystal B: | Crystal C: |
|---|---|---|
| 7.6—7.9 A. | 4.92±0.04 A. | 2.82±0.03 A. |
| 3.20±0.05 A. | 3.10±0.04 A. | 1.84±0.03 A. |

A novel class of crystalline zircono-silicate zeolites of this invention, characterized by relatively high $SiO_2/ZrO_2$ mole-ratios, corresponds to the following empirical formula:

$$(D_{2/n}O)_x:ZrO_2:(SiO_2)_y \qquad (3)$$

wherein D is a monovalent metal, a divalent metal, ammonium or hydrogen, $n$ is a valence of D, $x$ is a number from about 1.5 to 4, and $y$ is a number from about 4.5 to 8.5. These zircono-silicate zeolites appear to exhibit at least three different crystal forms wherein the respective X-ray power diffraction patterns include major $d$ spacings as follows:

| Crystal D: | Crystal E: | Crystal F: |
|---|---|---|
| 5.75±0.05 A. | 4.00±0.04 A. | 11.5±0.06 A. |
| 3.10±0.04 A. | 3.10±0.04 A. | 3.81±0.04 A. |
| 2.85±0.04 A. | 2.85±0.04 A. | 2.79±0.04 A. |

The minor variations in the position of $d$ spacings for a single crystal form are occasioned by variations in water content and the nature of the zeolitic cations present.

In recent years there has been an extensive development in the field of synthetic alumino-silicate molecular sieve zeolites having a wide variety of crystal forms and crystal pore diameters. These alumino-silicate molecular sieves are generally prepared by digesting at elevated temperatures an aqueous solution of sodium hydroxide, sodium aluminate and sodium silicate. There has been little or no analogous development of synthetic zeolites based on the amphoteric metals of Group IV–B, even though the existence of naturally occurring zircono-silicates and titano-silicates would seem to indicate the possibility of such a development. Probably the principal reason for the lack of development of synthetic Group IV–B metallo-silicate zeolites has been the lack of any practical method of manufacture from aqueous media. It is generally believed that crystalline zeolites are most readily prepared by precipitation from alkaline solutions of a homogeneous gel structure, which probably includes microcrystalline precursors of the macro-crystalline zeolites obtained by further digesting the gel in its mother liquor. Such techniques have heretofore not been feasible for the manufacture of Group IV–B metallo-silicates because it has been impossible to obtain a homogeneous solution of alkaline Group IV–B metallates and silicates, the alkali metal zirconates, titanates and hafnates being substantially insoluble in water. The coprecipitation of soluble acidic Group IV–B metal compounds such as zirconyl halides or titanyl halides with alkaline silicates has resulted in heterogeneous coprecipitation of relatively non-zeolitic co-gels, which are very difficult to convert to homogeneous crystalline zeolites.

It has now been discovered that the peroxo compounds of the alkali metal zirconates, titanates and hafnates are quite soluble in water, and may be mixed with alkaline silicate solutions with the formation of a soluble peroxo-Group IV–B metallo-silicate complex. Further, the resulting solution of peroxo-Group IV–B metallo-silicate complex may be heated to decompose the peroxo compound with liberation of oxygen, and the formation of a soluble, or at least colloidally dispersed, metastable Group IV–B metallo-silicate complex which can be destabilized to precipitate a homogeneous gel, or gelatinous precipitate. The gel or gelatinous precipitate may then be separated, washed, and dried to form a relatively amorphous zeolite, or it may be further digested, in the mother liquor, preferably at elevated temperatures, to form a more highly crystalline zeolite. It has further been found that, by varying the proportion of water, alkali metal, silicate and Group IV–B metallate components in the solution, zeolites of substantially different crystal structure and silicate content may be obtained.

In the novel method for manufacture of the new zeolites of this invention, the critical reagent is an alkali metal peroxo-Group IV–B metallate, $M_4XO_6$, or hydrated forms thereof, wherein M is an alkali metal and X is an amphoteric Group IV–B metal. It will be understood that only the three metals, titanium, zirconium and hafnium are amphoteric among the group IV–B metals, thorium being purely basic in character and hence incapable of forming the ion-deficient coordination complexes necessary for zeolitic structures. Any one, or a mixture, of the alkali metal peroxo-titanates, peroxo-zirconates or peroxo-hafnates, can be employed herein to form soluble, alkaline peroxo-metallo-silicate complexes, which ultimately can yield alkali metal zircono-silicates, alkali metal titano-silicates, alkali metal hafno-silicates, alkali metal zircono-titano silicates, alkali metal zircono-hafno-silicates, etc., all of which are markedly zeolitic in character.

The soluble peroxo-Group IV–B metallates can be prepared by reacting the insoluble hydrous Group IV–B metal oxides with an alkali metal hydroxide and a soluble peroxide such as sodium peroxide or hydrogen peroxide, e.g.:

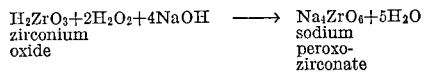

Alternatively, they may be prepared from the acidic oxyhalide salts of the Group IV–B metals by reacting the same with hydrogen peroxide, followed by neutralization with alkali metal hydroxide, e.g.:

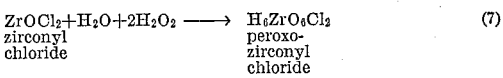
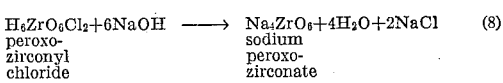

In place of the Group IV–B metal oxyhalides, the corresponding sulfate salts, e.g., zirconyl sulfate, can also be employed to prepare acidic peroxo metallo-sulfate solutions which can then be converted to the soluble alkali metal peroxo metallates.

The method illustrated by Equations 4, 5 and 6 is advantageous in that no extraneous salts are formed in the peroxo metallate solution, which salts can in some cases interfere with the subsequent formation of soluble silicate complexes. It is disadvantageous however in that considerable time is required to being about the formation of the soluble peroxo metallates from the insoluble hydrous oxides. The method illustrated by Equations 7 and 8 is advantageous in that the formation of the peroxo-metal oxyhalide in Equation 7 proceeds quite rapidly; it is disadvantageous however in that extraneous salts are formed upon neutralization with metal hydroxide in Equation 8.

The disadvantages of each of the foregoing methods can be substantially avoided by a three-step process involving formation of an intermediate insoluble peroxo-metal oxide which can then be filtered from the salt-containing solution and reacted with alkali metal hydroxide to form the soluble alkali metal peroxo metallate, as illustrated by the following equations:

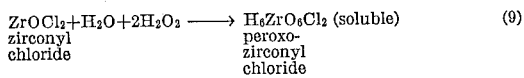
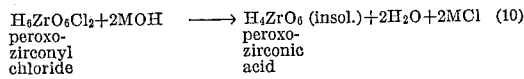

The MOH reactant in Equation 10 may be either an alkali metal hydroxide or ammonium hydroxide. If an alkali metal hydroxide is used, it is critical to employ no more than about two moles thereof per mole of peroxo zirconic acid, in order to avoid the formation of soluble zirconates as in Equation 11. Ammonium hydroxide however can be employed in excess since it is a sufficiently weak base to preclude the formation of soluble peroxo metallates as shown in Equation 11.

In any of the above methods of manufacture, it is preferred to use from about 2 to 5 moles of peroxide per mole of Group IV–B metal oxide, although proportions as low as 1 mole and as high as 8 moles can in many instances be used. The hydrous oxides employed as starting material in Equations 4, 5 and 6 are preferably prepared by reacting soluble salts, e.g., zirconyl halides, titanium sulfate, etc., with an alkali metal or ammonium hydroxide. The zirconyl chloride employed in Equations 7 and 9 may result either from the dissolving of zirconium tetrachloride in water, or by dissolving commercial zirconyl chloride, $ZrOCl_2 \cdot 8H_2O$, in water.

A number of methods have been found effective for combining the peroxo-Group IV–B metallate solutions with silicate solutions in such manner as to form an initial peroxo-Group IV–B metallo-silicate complex which is soluble, and which is capable of being heated to decompose the peroxo component and form an alkali metal Group IV–B metallo-silicate complex which is also soluble, or at least metastable as a colloidal hydrosol. According to one method, the peroxo-Group IV–B metallate solution may be admixed directly with aqueous alkali metal silicate solutions, e.g., aqueous sodium silicate. According to another method, the reactions illustrated in Equations 8 and 11 may be combined with the addition of alkaline silicate, i.e., instead of reacting the peroxo-metal oxyhalide or peroxo zirconic acid with alkali metal hydroxide alone, they are reacted with a solution of alkali metal silicate containing the required amount of excess alkali metal hydroxide. According to a third method, the acidic peroxo-metal oxyhalide solutions resulting from the reactions depicted by Equation 7 or 9 may be admixed with colloidal silica hydrosols, e.g., "Ludox," and the resulting soluble mixture may then be treated with sufficient alkali metal hydroxide solution to form the alkali metal peroxo-Group IV–B metallate and alkali metal silicate, and provide the desired excess of metal hydroxide. In this third method, any high-surface-area form of silica may be employed in place of silica hydrosol, e.g., silica hydrogel, silica xerogel, etc.

Following the formation of the peroxo-Group IV–B metallo-silicate solution, the peroxo oxygen is removed from the complex, preferably by heating at, e.g., 50–150° C. Decomposition can also be effected at lower temperatures over longer periods of time. In some cases it will be found that decomposition of the peroxo compound results in the substantially immediate formation of a precipitate or gel. This precipitation may be substantially complete, indicating that destabilization and de-peroxidation occurred substantially simultaneously. Or, some of the Group IV–B metal may precipitate as hydrous oxide indicating a deficiency in silica content of the solution relative to Group IV–B metal. The former situation can normally be corrected by reducing the water ratios in the solution, and/or by avoiding the presence of extraneous salts in the solution. However, even in those cases where simultaneous destabilization and de-peroxidation does occur, the resulting precipitate is highly zeolitic in character, and is hence not excluded herein. The principal disadvantage in simultaneous de-peroxidation and destabilization lies in the greater difficulty of converting the resulting amorphous precipitate to homogeneous crystalline zeolites.

In the latter case, i.e., where precipitation of excess Group IV–B metal oxide occurs, there may be a resultant amorphous oxide contamination of the zeolite to be subsequently precipitated by destabilization. To avoid this result, the initial oxide precipitate formed on de-peroxidation can be removed by filtration prior to destabilization of the mother liquor, or the precipitation may be prevented by adjusting the initial silica content of the solution to provide at least about 8 moles and up to about 30 moles thereof per mole of Group IV–B metal oxide, the ratios of the remaining components being as hereinafter prescribed in Table 1.

Destabilization of the metastable alkali metal Group IV–B metallo-silicate solutions or sols, with resultant formation of hydrogels, crystalline precipitates, or gelatinous precipitates, can be brought about by a wide variety of physical and/or chemical means. In most cases, heating at temperatures of, e.g., 75–300° C. is effective. Simply aging the solution at 20–50° C. is also effective in some cases. Alternatively, or in addition to heating and/or aging, it has been found that nearly any substantial alteration of the ionic equilibria of the solution will effect a destabilization, as for example by the addition of soluble salts such as ammonium chloride, alkali metal chlorides, nitrates, phosphates; the addition of alkali metal hydroxides, or weak acids such as acetic acid or carbon dioxide, or simply the addition of more water. Destabilization of the solutions by these methods may be substantially instantaneous, or it may in some cases be more gradual, over a period of, e.g., 10 minutes to 10 hours or more.

A surprising aspect of the destabilization phenomenon is that highly zeolitic materials rich in silica and alkali metal can be precipitated from solutions of extremely high pH, normally above 13, and in any case, above 12. This clearly indicates that discrete chemical compounds, or coordination complexes, of silica, Group IV–B metal oxide and alkali metal oxide are formed; otherwise the silica would remain in solution at these high alkalinities. However, it is not intended that the invention be limited to the actual existence of such complexes in solution; the critical operative factor is simply the existence of soluble or colloidal Group IV–B metal oxide at the high alkalinities involved.

Following destabilization, maximum crystallinity can be induced in the zeolite by digesting the gelatinous precipitate or gel at elevated temperatures in the mother liquor. Digesting may be continued at, e.g., 50–300° C. or higher for periods of time ranging between about 1 hour and 6 days or more.

The alkali metal hydroxides and salts employed in the above preparations may comprise any of the metals lithium, sodium, potassium, rubidium, cesium or mixtures thereof. Generally the sodium and potassium salts are preferred.

Suitable overall mole-ratios of reacting components in the zeolite-forming solutions of this invention are illustrated in the following table (for zeolites of maximum crystallinity):

TABLE 1

| Mole Ratios | Operative | Preferred |
|---|---|---|
| $M_2O/SiO_2$ [1] | 0.25–2 | 0.30–1.5 |
| $SiO_2/XO_2$ | 7–30 | 10–20 |
| $H_2O/M_2O$ [1] | 50–10 | 30–15 |

[1] Exclusive of alkali metal present in the form of extraneous salts such as NaCl. (X=Zr, Ti or Hf; M=alkali metal.)

Where crystallinity is not a prime consideration, reactant ratios considerably outside the above ranges may be utilized. In particular, the $SiO_2/XO_2$ mole-ratios may range between about 4 and 40, and the $H_2O/M_2O$ ratios between about 150 and 10.

Any of the alkali metal zeolites disclosed herein can be converted to other metal forms by conventional methods of ion exchange, involving simply the digestion of the alkali metal zeolite with an appropriate aqueous solution of a salt of the desired displacement metal, wherein the metal appears in the cation. Exhaustive exchange ordinarily will require several stages of digestion. By these methods the zeolitic alkali metal ions can be either partially or completely replaced by other metal ions including for example beryllium, magnesium, calcium, strontium, barium, zinc, cadmium, copper, silver, manganese, iron, cobalt, nickel, ruthenium, rhodium, palladium, platinum, and the like.

The following examples are cited to illustrate representative methods for the manufacture of zeolites of this invention, and the products obtained thereby. The various crystal forms obtained are identified by X-ray power diffraction pattern data obtained on a Geiger counter spectrometer with pen recorder using filtered copper K-alpha radiation (gamma=1.54050 A.).

*Example I*

*Preparation of zircono-silicate zeolite via hydrous zirconia.*—Ten gms. of zirconyl chloride ($ZrOCl_2 \cdot 8H_2O$) is dissolved in 50 ml. water. This solution is added to 100 ml. of 5% aqueous potassium hydroxide to form a gelatinous precipitate of hydrous zirconia. The precipitated mixture is cooled to 5° C. before adding 50 gm. of precooled 30% hydrogen peroxide. The mixture is kept at 5° C. and stirred occasionally for 2 hours. Then the temperature is slowly increased to 25° C. during a 12-hour period. During the warming much of the excess peroxide decomposes. The result is a clear solution of potassium peroxo zirconate.

The potassium peroxo zirconate solution is then mixed with an equal volume of 40° Bé. sodium silicate. The resulting mixture remains as a clear solution. The peroxo zirconate and the silicate react to form a stable soluble complex which remains in solution after the covalently bound peroxo oxygen is released by heating for about 30 minutes at 100° C.

Upon the addition of 70 ml. of 6 N acetic acid, a precipitate of potassium-sodium-zircono-silicate is produced, having zeolitic and adsorptive properties.

*Example II*

*Preparation of zircono-silicate zeolite via peroxo zirconyl chloride.*—To 1 liter of a 1.0 molar solution of zirconyl chloride is added 3 moles of hydrogen peroxide in the form of a 30% aqueous solution. No aging is required in order to form the peroxo-zirconyl chloride compound. The mixture is then cooled to about 5° C. and 5 moles of sodium hydroxide in the form of a precooled 10 N solution is added. A clear solution of sodium peroxo zirconate is produced.

To the solution of sodium peroxo zirconate is then added sufficient 40° Bé. sodium silicate (8.9% $Na_2O$, 28.5% $SiO_2$) to provide 15 moles of $SiO_2$. A soluble peroxo zirconate-silicate complex is formed which is decomposed by aging the solution at room temperature for 72 hours, during which period destabilization also occurs with resultant formation of a gel. Following the aging at room temperature the mixture is further digested at 95° C. for 16 hours and the resulting crystalline precipitate is filtered off, washed and dried. The resulting material is a sodium zircono-silicate zeolite, a sample of which had the property of completely adsorbing the color from an ammoniacal 0.01 M solution of tetrammine cupric nitrate, using 10 ml. of the solution for 0.5 gm. of solid. Moreover, the solid itself remained white. The complete disappearance of color from the solution, without imparting color to the solid, indicates that the adsorption occurred entirely by ion exchange.

*Example III*

*Preparation of zircono-silicate zeolite via peroxo zirconic acid.*—To 200 ml. of 1.0 M zirconyl chloride solution is added with stirring at room temperature, 81 ml. of 30% $H_2O_2$. The resulting mixture is then cooled to 5° C. and precooled 4 N ammonium hydroxide solution is added until the pH is 9-10, whereupon all of the zirconium precipitates as peroxo zirconic acid which is removed by filtration and washed with cold water. The washed precipitate is then added to a precooled mixture composed of 250 ml. of 10 N sodium hydroxide and 226 ml. of 40° Bé. sodium silicate solution. Upon aging the mixture overnight at 5° C., the peroxo zirconic acid redissolves giving a clear solution.

Upon boiling this solution to decompose the peroxo zircono-silicate, a clear supernatant solution is produced having the following mole-ratio of components:

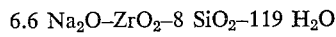

6.6 $Na_2O$–$ZrO_2$–8 $SiO_2$–119 $H_2O$

This solution can be readily destabilized to produce gelatinous zeolite precipitates by adding, e.g., 10% of water and heating, adding carbon dioxide, acetic acid, or by adding 1–10% of extraneous salts such as sodium chloride, sodium sulfate, sodium phosphate and the like.

A zeolite prepared as described above, and having a $SiO_2/ZrO_2$ mole-ratio of 7.3/1, was subjected to ion exchange with an aqueous solution of ammonium chloride in four stages. After the first stage the zeolite contained 22.5 weight-percent $Na_2O$, after the second exchange 3.2%, after the third 0.91%, and after the fourth 0.021%. This behavior is typical of crystalline materials containing tightly bound zeolitic sodium ions. An amorphous silica-zirconia composite containing the same initial sodium content, and prepared by coprecipitating zirconyl chloride solution with sodium silicate (no peroxo intermediate), and which likewise had an initial silica/zirconia ratio of 7.3/1, was subjected to the identical ion exchange treatment, and after the first stage the product contained only 7.5 weight-percent $Na_2O$, after the second 0.65%, after the third 0.49%, and after the fifth 0.014%. This behavior is typical of amorphous coprecipitates wherein very little of the sodium content is zeolitically combined.

*Example IV*

This example illustrates the preparation and identification of several crystalline sodium zircono-silicate zeolites, using silica hydrosol as the source of $SiO_2$. The general procedure used in each preparation was as follows:

Zirconyl chloride ($ZrOCl_2 \cdot H_2O$) is mixed with a small amount of water to form a saturated solution containing undissolved zirconyl chloride. To the resulting slurry is then added precooled (40° F.) hydrogen peroxide to form a clear solution of peroxo-zirconyl chloride. The peroxo-zirconyl chloride solution is then mixed with 30% silica hydrosol (Ludox AM), and the mixture allowed to age for 2 hours at room temperature, and then cooled to 40° F. Aqueous sodium hydroxide solution (10 N), precooled to 40° F., is then stirred into the peroxo zirconyl chloride-silica hydrosol combination. This final mixture is aged for 2 hours at room temperature, warmed on a steam bath to decompose the peroxide complex, aged for 16 hours at room temperature, and then aged for 24 hours at 180° F., during which period the crystalline zeolite is formed. The resulting precipitate is collected by filtration, washed by resuspending twice in distilled water, and then dried at 220° F. The proportions of reactants used in the various preparations were as set forth in the following table:

TABLE 2.—PREPARATION OF ZEOLITES

| Zeolite No | ZS-2 | ZS-3 | ZS-4 | ZS-5 | ZS-7 | ZS-8 |
|---|---|---|---|---|---|---|
| Reagents Used: | | | | | | |
| 10 N NaOH, ml | 200 | 200 | 300 | 100 | 150 | 200 |
| 30% $H_2O_2$, ml | 25 | 13 | 13 | 25 | 13 | 13 |
| 30% $SiO_2$, ml | 332 | 166 | 166 | 250 | 125 | 125 |
| $H_2O$, ml | 10 | 5 | 5 | 10 | 5 | 5 |
| $ZrOCl_2 \cdot 8H_2O$, gm | 32.2 | 16.1 | 16.1 | 32.2 | 16.1 | 16.1 |
| Mole-Ratios of Reacting Components: | | | | | | |
| $Na_2O$ | 10 | 20 | 30 | 5 | 15 | 20 |
| $ZrO_2$ | 1 | 1 | 1 | 1 | 1 | 1 |
| $SiO_2$ | 20 | 20 | 20 | 15 | 15 | 15 |

In all of the foregoing preparations, crystalline zeolites were obtained containing substantial proportions of sodium, zirconia and silica. The major identifying characteristics of the products, as determined by standard X-ray diffraction analysis and chemical analysis for silica and zirconia, were as follows:

TABLE 3.—ANALYSIS OF ZEOLITES

| Zeolite No | ZS-2 | ZS-3 | ZS-4 | ZS-5 | ZS-7 | ZS-8 |
|---|---|---|---|---|---|---|
| Major X-ray Diffraction Spacings, A | 5.75 | 4.00 | 4.87 | 4.00 | 4.04 | 4.87 |
| | 3.10 | 3.10 | 4.00 | 3.10 | 3.12 | 4.04 |
| | 2.98 | 3.00 | 3.10 | | 2.85 | 3.11 |
| | 2.89 | 2.85 | 2.84 | | | 2.85 |
| | 2.85 | | 2.53 | | | 2.72 |
| | 2.78 | | | | | 2.47 |
| | 2.10 | | | | | |
| | 2.08 | | | | | |
| | 2.00 | | | | | |
| Mole-Ratio, $SiO_2/ZrO_2$ | 5.95 | 7.07 | 7.11 | 8.18 | 5.38 | 5.54 |

All of these materials are found to display useful ion exchange and adsorption characteristics.

Example V

This example illustrates that distinctly different crystal forms are obtained depending upon aging temperature, and upon order of combining of the ingredients. In this example, the silica and zirconia components were separately precombined with sodium before admixture with each other, rather than after admixture as in Example IV. The overall mole-ratio of reacting components was: 12 $Na_2$–$ZrO_2$–15 $SiO_2$, but the preparation method was as follows:

To 10 ml. of precooled 2.0 M zirconyl chloride solution was added 8 ml. of 30% hydrogen peroxide solution. Then 30 ml. of 10 N sodium hydroxide solution was added with stirring and cooling. The resulting sodium peroxo-zirconyl chloride solution was then mixed with 46 ml. of 40° Bé. sodium silicate solution (B and A Code 2289), and the resulting solution was heated to 200° C. for 36 hours in a sealed vessel to effect destabilization and aging. A white crystalline precipitate was formed which was filtered off, washed, dried and subjected to X-ray diffraction analysis for crystallinity. The major $d$ spacings were as follows: 11.5 A., 3.81 A., 3.70 A., 2.79 A.

This preparation should be compared with zeolite ZS–7 of Example IV, wherein the mole-ratios of reacting components were very similar. However, the marked difference in $d$ spacings shows that distinctly different crystal forms were produced.

Example VI

This example illustrates the preparation and identification of several crystalline sodium titano-silicate zeolites, using silica hydrosol as the source of $SiO_2$. The general procedure was similar to that described in Example IV, but titanyl chloride solution was substituted for the zirconyl chloride. The peroxo-titanyl chloride solutions were prepared by mixing titanium tetrachloride solutions with 30% hydrogen peroxide solutions, as indicated in Table 4. The resulting solutions were then mixed with the indicated proportions of silica hydrosol. Following this point, the procedure for zeolites TS–6 and TS–12 was somewhat different than for zeolites TS–22 through TS–33, as follows:

*TS–6—TS–12 Procedure.*—The peroxo titanyl chloride-silica hydrosol mixture was allowed to stand several hours at room temperature. Then sodium hydroxide solution was added and the mixture was heated on a steam bath to decompose the peroxo compounds and bring about destabilization. After foaming and bubbling had ceased the alkaline mixture was aged for 72 hours at 85° C.

The aged precipitates were collected by filtration, and then reslurried and washed twice with large volumes of distilled water to remove any soluble components. The washed precipitates were dried for 16 hours at 110° C. and then checked for crystallinity by X-ray diffraction.

*TS–22—TS–33 Procedure.*—The peroxo titanyl chloride-silica hydrosol mixture was allowed to age one hour at room temperature. Then precooled (40° F.) sodium hydroxide solution was added slowly with rapid stirring. During the mixing, additional cooling was occasionally necessary to prevent the decomposition of peroxide. The alkaline mixtures were aged 16 hours at room temperature and then warmed and stirred on a steam bath to complete the decomposition of the peroxide. Next, the mixtures were placed in closed containers to prevent evaporation and aged for 48 hours at 85° C. The resulting precipitates were collected by filtration, resuspended and washed twice with distilled water to remove any dissolved salts, and finally dried at 220° F. before measuring the X-ray diffractions.

The proportions of reactants used in the various preparations were as set forth in the following table:

TABLE 4.—PREPARATION OF ZEOLITES

| Zeolite No. | TS–6 | TS–12 | TS–22 | TS–23 | TS–26 | TS–33 |
|---|---|---|---|---|---|---|
| Reagents Used: | | | | | | |
| 10 N NaOH, ml. | 100 | 132 | 220 | 210 | 220 | 160 |
| 30% $H_2O_2$, ml. | 16.5 | 41.5 | 25 | 12.5 | 25 | 50 |
| 30% $SiO_2$, ml. | | | 334 | 167 | 250 | 167 |
| 22% $SiO_2$, ml. | 120 | 100 | | | | |
| 2 M $TiOCl_2$, (a) ml. | 16.5 | 41.5 | | | | |
| 4 M $TiOCl_2$, (a) ml. | | | 25 | 12.5 | 25 | 50 |
| Mole-Ratios of Reacting Components: | | | | | | |
| $Na_2O$ | 15 | 8 | 11 | 21 | 11 | 4 |
| $TiO_2$ | 1 | 1 | 1 | 1 | 1 | 1 |
| $SiO_2$ | 15 | 5 | 20 | 20 | 15 | 5 |

(a) These solutions also contained excess HCl resulting from the reaction, $TiCl_4 + H_2O \rightarrow TiOCl_2 + 2HCl$.

In all of the foregoing preparations, crystalline zeolites were obtained containing substantial proportions of sodium, titania and silica. The major identifying characteristics of the zeolites, as determined by standard analytical methods were as follows:

TABLE 5.—ANALYSIS OF ZEOLITES

| Zeolite No. | TS–6 | TS–12 | TS–22 | TS–23 | TS–26 | TS–33 |
|---|---|---|---|---|---|---|
| Major X-ray Diffraction Spacings, A. | 7.75 | 7.62 | 4.92 | 4.92 | 7.89 | 7.62 |
| | | | 4.04 | 3.08 | 5.53 | |
| | | | 3.11 | 2.72 | 4.55 | |
| | | | | 2.25 | 3.20 | |
| Mole-Ratios: | | | | | | |
| $SiO_2/TiO_2$ | 0.99 | 0.98 | 3.21 | 1.03 | 1.92 | 2.88 |
| $Na_2O/TiO_2$ | 0.53 | 0.72 | | | | |

All of these zeolites are found to display useful ion exchange and adsorption characteristics.

Example VII

This example illustrates that distinctly different crystal forms are obtained, depending upon aging temperature, and upon order of combining of the ingredients. In this example, the silica and titania components were separately precombined with sodium before admixture with each other than after admixture as in Example VI. The overall mole-ratio of reacting components was: 12 $Na_2O$–$TiO_2$–15 $SiO_2$, but the preparation method was as follows:

To 10 ml. of precooled 2.0 M titanyl chloride solution (prepared by adding titanium tetrachloride to water), was added 10 ml. of 30% hydrogen peroxide solution. Then 30 ml. of 10 N sodium hydroxide was added with cooling to keep the temperature below 40° F. The resulting sodium peroxo titanyl chloride solution was then mixed with 46 ml. of 40° Bé. sodium silicate solution, and the resulting mixture was heated to boiling to decompose the peroxides. The resulting mixture was allowed to stand several weeks at room temperature, and then the clear solution was aged in a sealed vessel for 36 hours at 200° C., during which period destabilization and aging of the precipitate took place. After the aging period the heavy white precipitate was filtered off, washed and dried. X-ray diffraction analysis showed that the precipitate was crystalline, with major $d$ spacings at 2.82 and 1.84 A.

This preparation should be compared with zeolite TS-26 of Example VI, wherein the mole-ratios of reacting components were very similar. However, the marked difference in $d$ spacings shows that distinctly different crystal forms were produced.

*Example VIII*

This example illustrates the preparation of a four-component sodium titano-zircono-silicate zeolite. The overall mole-ratio of reacting components was: 24 $Na_2O$–$TiO_2$–30 $SiO_2$, the mode of procedure being as follows:

To 10 ml. of 2.0 M zirconyl chloride solution was added 10 ml. of 2.0 M titanyl chloride solution. The resulting mixture was cooled to about 40° F., and 16 ml. of 30% hydrogen peroxide solution was added. Then 60 ml. of 10 N sodium hydroxide solution was added slowly with cooling, after which the solution was mixed with 92 ml. of 40° Bé. sodium silicate solution. The resulting clear solution was heated to boiling and then allowed to stand for several weeks at room temperature. The solution was then heated to effect destabilization, and aged for 36 hours at 200° C. in a sealed vessel. The heavy white precipitate which formed was filtered off, washed and dried. X-ray diffraction analysis showed the following major $d$ spacings: 11.6 A.; 5.60 A.; 3.77 A.; 2.78 A.; 2.62 A.; 2.12 A.; 1.65 A.

Analysis of this diffraction data indicates the presence of a single crystalline phase; the product is hence not a crystalline mixture of the titano-silicate zeolite of Example VII and the zircono-silicate zeolite of Example V. Further analysis of the diffraction data indicates that the crystal structure is cubic with a 16.8 A. unit cell.

Results analogous to those indicated in the foregoing examples are obtained when other proportions of reactants and conditions within the broad purview of the disclosure are employed. It is hence not intended to limit the invention to the details of the examples, but broadly as defined in the following claims.

I claim:

1. A composition of matter consisting essentially of a crystalline zircono-silicate zeolite, corresponding to the empirical formula:

$$(D_{2/n}O)_x : ZrO_2 : (SiO_2)_y$$

wherein D is selected from the class consisting of monovalent metals, divalent metals, ammonium and hydrogen, $n$ is the valence of D, $x$ is a number from about 1.5 to 4, and $y$ is a number from about 4.5 to 8.5, and wherein said zeolite displays an X-ray powder diffraction pattern including all the $d$ spacings of one of the patterns selected from the following group:

| Pattern D: | Pattern E: | Pattern F: |
|---|---|---|
| 5.75 ± 0.05 A. | 4.00 ± 0.04 A. | 11.5 ± 0.06 A. |
| 3.10 ± 0.04 A. | 3.10 ± 0.04 A. | 3.81 ± 0.04 A. |
| 2.85 ± 0.04 A. | 2.85 ± 0.04 A. | 2.79 ± 0.04 A. |

2. Zeolites as defined in claim 1 wherein D is an alkali metal.

3. A zeolite as defined in claim 1 whose X-ray diffraction pattern exhibits substantially the following major $d$ spacings in Angstrom units:

| 5.75 | 2.89 | 2.10 |
| 3.10 | 2.85 | 2.08 |
| 2.98 | 2.78 | 2.00 |

4. A zeolite as defined in claim 1 whose X-ray diffraction pattern exhibits substantially the following major $d$ spacings in Angstrom units:

| 4.00 | 3.00 | 2.85 |
| 3.10 | | |

5. A zeolite as defined in claim 1 whose X-ray diffraction pattern exhibits substantially the following major $d$ spacings in Angstrom units:

| 4.87 | 3.10 | 2.53 |
| 4.00 | 2.84 | |

6. A zeolite as defined in claim 1 whose X-ray diffraction pattern exhibits substantially the following major $d$ spacings in Angstrom units:

| 4.04 | 3.12 | 2.85 |

7. A zeolite as defined in claim 1 whose X-ray diffraction pattern exhibits substantially the following major $d$ spacings in Angstrom units:

| 4.87 | 3.11 | 2.72 |
| 4.04 | 2.85 | 2.47 |

8. A zeolite as defined in claim 1 whose X-ray diffraction pattern exhibits substantially the following major $d$ spacings in Angstrom units:

| 11.5 | 3.70 | 2.79 |
| 3.81 | | |

References Cited

UNITED STATES PATENTS 1,728,732   9/1929   Jaeger _____ 23—113 X

FOREIGN PATENTS 648,923   9/1962   Canada.

OTHER REFERENCES

Barrer et al., "Jr. Chemical Soc.," 1959, pp. 195–207.

OSCAR R. VERTIZ, *Primary Examiner.*

EDWARD J. MEROS, *Examiner.*